United States Patent
Chen et al.

(10) Patent No.: US 8,225,258 B2
(45) Date of Patent: Jul. 17, 2012

(54) STATISTICAL INTEGRATED CIRCUIT PACKAGE MODELING FOR ANALYSIS AT THE EARLY DESIGN AGE

(75) Inventors: Xiaoming Chen, San Diego, CA (US); Jack Monjay Yao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 12/482,825

(22) Filed: Jun. 11, 2009

(65) Prior Publication Data

US 2010/0318955 A1 Dec. 16, 2010

(51) Int. Cl.
*G06F 17/50* (2006.01)
(52) U.S. Cl. ........ 716/115; 716/106; 716/107; 716/136; 716/137; 716/138
(58) Field of Classification Search .................. 716/106, 716/107, 108, 109–114, 115, 132, 133, 136, 716/137, 138, 139
See application file for complete search history.

(56) References Cited

U.S. PATENT DOCUMENTS

| | | | |
|---|---|---|---|
| 7,131,094 B2 * | 10/2006 | Kolk et al. | 716/102 |
| 7,725,866 B2 * | 5/2010 | Kobayashi et al. | 716/137 |
| 2003/0061571 A1 * | 3/2003 | Buffet et al. | 716/1 |
| 2008/0320424 A1 * | 12/2008 | Budell et al. | 716/5 |
| 2009/0150840 A1 * | 6/2009 | Kousaki et al. | 716/5 |
| 2009/0193370 A1 * | 7/2009 | Bantas et al. | 716/4 |

FOREIGN PATENT DOCUMENTS

WO  WO2008065102  6/2008

OTHER PUBLICATIONS

Byong-Su Seol et al: "Electrical modeling and analysis of lead-bonded and wire-bonded /spl mu/BGA packages for high-speed memory applications"27th. IEEE/CPMT/SEMI International Electronics Manufacturing Technology Symposium. (IEMT). San Jose, CA, Jul. 17-18, 2002; [IEEE/CPMT International Electronics Manufacturing Technology (IEMT) Symposium], New York, NY : IEEE, US LNKD- DOI:10.1109/IE, Jul. 17, 2002, pp. 250-258,XP010603425 1-19.
Jin Zhao et al: "Signal Power Integrity and Design Consideration in Package Modeling"Electronics Packaging TechnologyConference, 2008. EPTC 2008. 10th, IEEE,Piscataway, NJ, USA,Dec. 9, 2008, pp. 71-77,XP031413785 ISBN: 978-1-4244-2117-6.
International Search Report and Written Opinion—PCT/US2010/038351—ISA/EPO—Oct. 5, 2010.

* cited by examiner

*Primary Examiner* — Jack Chiang
*Assistant Examiner* — Nha Nguyen
(74) *Attorney, Agent, or Firm* — Michelle Gallardo; Nicholas J. Pauley; Jonathan T. Velasco (57) ABSTRACT

In designing an integrated circuit on a die having a set of die bumps, a method to generate a set of lumped circuit parameter values associated with the set of die bumps, based upon distances between the set of die bumps and the center of the die, the method also based upon a sample-data distribution function of a die bump distance variable and a sample-data distribution function of a lumped circuit parameter variable. Other embodiments are described and claimed.

18 Claims, 5 Drawing Sheets

STATISTICAL INTEGRATED CIRCUIT PACKAGE MODELING FOR ANALYSIS AT THE EARLY DESIGN AGE

FIELD

The present invention relates to modeling of integrated circuit packages.

BACKGROUND

In a flip chip packaged integrated circuit, a die containing the integrated circuit has its active side facing a package substrate. Die bumps are soldered to pads on the active side, and are soldered to pads on the package substrate to provide electrical connection between the integrated circuit and the package substrate, as well as to provide a load bearing link between the die and the package substrate. The die bumps form part of the so-called level 1 interconnect, may comprise solder, for example, and may be fabricated by the Controlled Collapse Chip Connection (C4) evaporative bump process. Package contacts on the bottom of the package substrate are electrically coupled to the package substrate pads, forming part of the so-called level 2 interconnect. The package contacts may be solder balls, for example. An underfill is usually applied at the interface between the die and the package substrate to help compensate for the difference in the coefficient of thermal expansion (CTE) between the die and the package substrate.

The die bumps on a die provide power, ground, and I/O (input/output) signals to the integrated circuit. For example, some die bumps serve as a ground connection, some die bumps provide a supply voltage $V_{CC}$, and some die bumps provide various input and output signals. Many design constraints come into play when determining the number and placement of these types of die bumps in the level 1 interconnect, and the number and placement of package contacts in the level 2 interconnect. One design goal is to reduce the overall inductance, capacitance, and resistance exhibited by these interconnect levels.

Traditionally, it has been difficult to design an integrated circuit package to satisfy a given level of performance unless the level 1 interconnect design has been given. However, integrated circuit designers often desire to evaluate their circuits based on an estimate of package performance before an integrated circuit design has been finalized.

A method by which integrated circuit designers may readily estimate integrated circuit package performance during the early design phase of an integrated circuit has utility.

SUMMARY

In an embodiment, a mapping (or function) is generated so that a set of lumped circuit parameter values may be associated with a set of die bump distance values. This mapping is generated based upon two sample-data distribution functions. A sample-data distribution function $F_D(d)$ is generated, where $F_D(d)$ is the fraction die bump distance measurements in a set of die bump distance measurements that are less than or equal to d. Also, a sample-data distribution function $F_Z(z)$ is generated, where $F_Z(z)$ is the fraction of lumped circuit parameter measurements in a set of lumped circuit parameter measurements that are less than or equal to z.

These two sample-data distribution functions are used to generate a set of pairs $\{(d_k, z_k), k=0, 1, \ldots, K\}$, where $F_D(d_k)=F_Z(z_k)$. The mapping is based upon the set of pairs $\{(d_k, z_k), k=0, 1, \ldots, K\}$.

In another embodiment, a set of lumped circuit parameter values associated with a set of die bump distance values is generated. This is based upon a set of pairs $\{(d_k, z_k), k=0, 1, \ldots, K\}$, where $F_D(d_k)=F_Z(z_k)$. The function $F_D(d)$ is a sample-data distribution function of a die bump distance variable D and d is a real-valued variable. The function $F_Z(z)$ is a sample-data distribution function of a lumped circuit parameter variable Z and z is a real-valued variable.

In another embodiment, a computer readable medium has instructions to cause a computer to generate a set of lumped circuit parameter values associated with a set of die bump distance values. This is based upon a set of pairs $\{(d_k, z_k), k=0, 1, \ldots, K\}$, where $F_D(d_k)=F_Z(z_k)$. The function $F_D(d)$ is a sample-data distribution function based upon a set of die bump distance measurements associated with a first set of die bumps, where $F_D(d)$ is the fraction of the number of die bump distance measurements in the set of die bump distance measurements less than or equal to d. The function $F_Z(z)$ is a sample-data distribution function based upon a set of lumped circuit parameter measurements associated with a second set of die bumps, where $F_Z(z)$ is the fraction of the number of lumped circuit parameter measurements in the set of lumped circuit parameter measurements less than or equal to z.

DESCRIPTION OF EMBODIMENTS

In the description that follows, the scope of the term "some embodiments" is not to be so limited as to mean more than one embodiment, but rather, the scope may include one embodiment, more than one embodiment, or perhaps all embodiments.

Figure 1A:
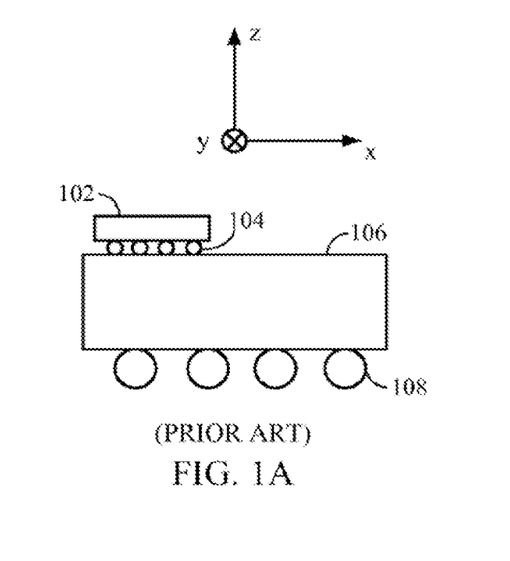
FIGS. 1A and 1B are plan views (not drawn to scale) of a flip chip packaged integrated circuit.
Figure 1B:
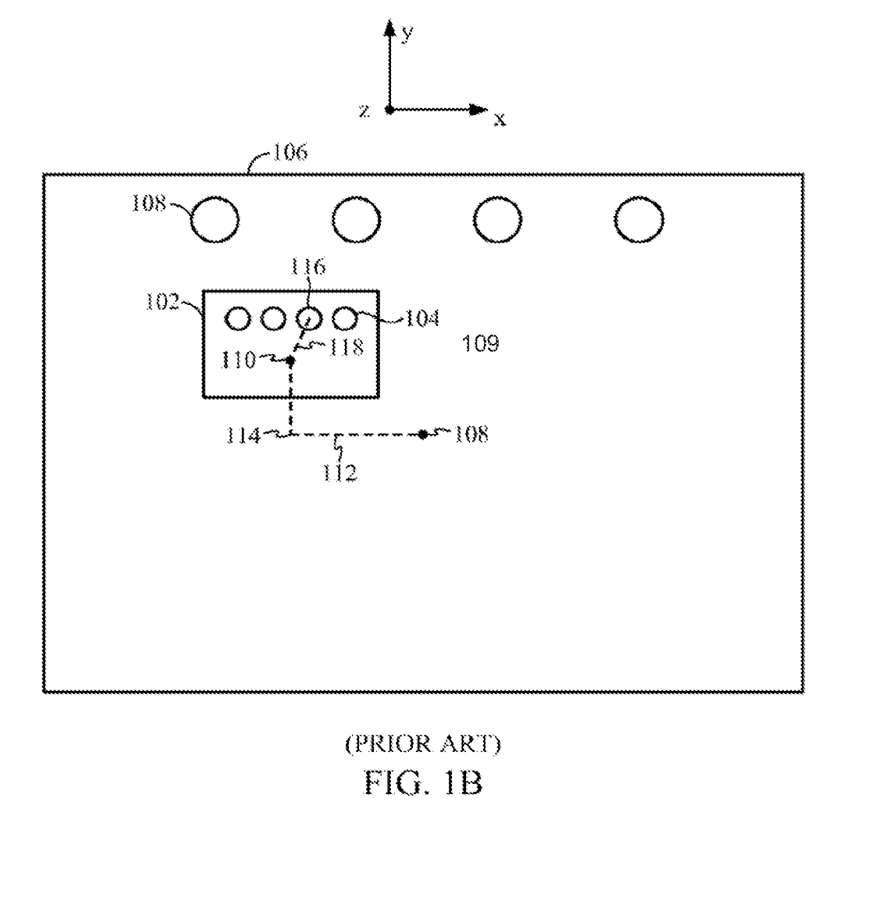

Before describing the embodiments, it is useful to introduce terminology by considering FIGS. 1A and 1B. FIGS. 1A and 1B illustrate two plan views of a flip chip packaged integrated circuit. For ease of illustration, these plan views are not drawn to scale, and not all features of a flip chip packaged integrated circuit are illustrated. Furthermore, the number of die bumps and package contacts illustrated is not necessarily representative of a typical flip chip packaged integrated circuit.

The relative orientation of these two plan views is indicated by two right-handed coordinate systems, each coordinate system above its corresponding plan view, where a cross hatch indicates a coordinate axis pointing into the page of the illustration, and a solid dot indicates a coordinate axis pointing out of the page of illustration. In FIG. 1A, the view is in a direction parallel to the y-axis of its corresponding coordinate system. FIG. 1A illustrates die 102 with die bumps 104 attached to package substrate 106 having package contacts 108. (The label 104 refers to all die bumps, and the label 108 refers to all package pins.) The view in FIG. 1B is in a direction parallel to the z-axis of its corresponding coordinate system. The views illustrated in FIGS. 1A and 1B are both looking into the page of the illustration, but are different plan views of the flip chip integrated circuit package because of the different orientations of their respective coordinate systems. FIG. 1A may be colloquially described as providing a side plan view, and FIG. 1B may be colloquially described as providing a top plan view.

Die 102 is placed in an offset position with respect to package substrate 106, so that the center of die 102 is not directly above the center of package substrate 106. In FIG. 1B, the center of package substrate 106 is denoted by the numeric label 109, and the center of die 102 is denoted by the numeric label 110. The offset may be described by the pair (x', y'), where x' is the difference in the x coordinates of centers 109 and 110, and y' is the difference in the y coordinates of centers 109 and 110. In FIG. 1B, the length of dashed line 112 represents the distance x', and the length of dashed line 114 represents the distance y'.

A variable of interest is the distance between the center of a die bump and die center 110. For example, the distance between die center 110 and the center of die bump 116 is represented by the length of dashed line 118. In the description of the embodiments, the variable D is used to represent a die bump center to die center distance. For simplicity, a die bump center to die center distance is referred to as a die bump distance, it being understood that the die center serves as a reference point for measuring the distance.

Figure 2:
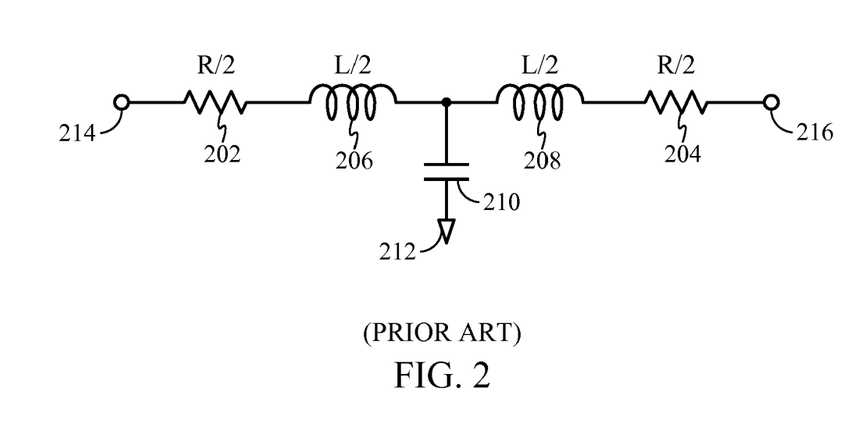
FIG. 2 is a schematic of the lumped circuit parameters associated with a die bump according to a prior art circuit model.

Some embodiments comprise a method for associating one or more lumped circuit parameters with each die bump. The one or more lumped circuit parameters associated with a die bump may be viewed as circuit parameters for modeling the die bump and the package contact to which that die bump is connected, as well as the connection (e.g., trace) between them. Although embodiments are not limited to any particular circuit model, for context, FIG. 2 illustrates a possible circuit model associated with a die bump and package contact pair. Illustrated in FIG. 2 is a circuit model for a die bump and package contact pair having the lumped circuit parameters of inductance L, capacitance C, and resistance R, where resistors 202 and 204 each have a resistance R/2, inductors 206 and 208 each have an inductance L/2, and capacitor 210 has a capacitance C. One of the terminals of capacitor 210 is connected to ground 212, node 214 is connected to a die bump, and node 216 is connected to a package contact.

An embodiment may not necessarily provide all the lumped circuit parameters indicated in FIG. 2. For example, for some embodiments the capacitance for capacitor 210 may be known based upon the size of the die bumps and the package contacts because the traces contribute little capacitance.

Some embodiments generate a sample-data distribution function for the die bump distance variable D, and a sample-data distribution function for each of the one or more lumped circuit parameter variables discussed previously. For ease of discussion, let Z stand for any one of the lumped circuit parameter variables. For example, Z may represent an inductance L, or it may represent a resistance R.

The sample-data distribution function for the die bump distance variable D will be denoted as $F_D(d)$, where d is a real-valued variable, and where $0 \leq F_D(d) \leq 1$. For some embodiments, a set of circuit dice are considered, where for each die in the set of circuit dice, each die bump distance from the die center is measured to provide a set of die bump distance measurements. For the set of circuit dice considered, there is then a family of sets of die bump distance measurements. (A family of sets is also a set.) For some real number d, $F_D(d)$ is the number of die bump distance measurements in the family of sets of die bump distance measurements that are less than or equal to d, divided by the total number of die bump distance measurements in the family. That is, $F_D(d)$ is the fraction of die bump distance measurements less than or equal to d.

The set of circuit dice from which $F_D(d)$ is determined may belong to a particular class of circuit dice. For example, each die in the set of circuit dice considered may have the offset (x', y'). For such embodiments, the offset (x', y') is a parameter for $F_D(d)$. For multiple offsets, a family of $F_D(d)$ may be generated, one for each offset.

There may be other classes considered, leading to other parameters for $F_D(d)$. For example, each die in the set of circuit dice may be fabricated under a particular semiconductor process technology.

The sample-data distribution function for the lumped circuit parameter variable Z will be denoted as $F_Z(z)$, where z is a real number, and where $0 \leq F_Z(z) \leq 1$. For some embodiments, a set of circuit dice are considered, where for each die in the set of circuit dice, the lumped circuit parameter variable Z for each die bump is measured to provide a set of lumped circuit parameter measurements. For the set of circuit dice considered, there is then a family of sets of lumped circuit parameter measurements. For some real number z, $F_Z(z)$ is the number of lumped circuit parameter measurements in the family of sets of lumped circuit parameter measurements that are less than or equal to z, divided by the total number of lumped circuit parameter measurements in the family. That is, $F_Z(z)$ is the fraction of lumped circuit parameter measurements less than or equal to z.

As discussed with respect to the sample-data distribution function $F_D(d)$, there may also be parameters for $F_Z(z)$. For example, $F_Z(z)$ may be parameterized by an offset (x', y'), or perhaps by semiconductor process technology, to name just two examples.

For some embodiments, a sample-data distribution function may be represented by a well known function. For example, it is found that for some embodiments, $F_D(d)$ is similar to a Rayleigh distribution function. When performed in the finite arithmetic of a digital computer, well known algorithms may be implemented to approximate a known function.

More generally, a function is a mapping, so that $F_D(d)$ may stand for a mapping between various values of d and $F_D(d)$. For example, when implemented in software, $F_D(d)$ may be represented by a data structure comprising a table of (I+1) pairs $(d_i, F_i)$, $i=0, \ldots, I$, where $F_D(d_i)=F_i$. Look-up table algorithms with interpolation or extrapolation algorithms may be used to provide $F_D(d')$ given a d' when d' does not necessarily belong to the set $\{d_i, i=0, \ldots, I\}$, or to provide d' given a $F_D(d')$ when $F_D(d')$ does not necessarily belong to the set $\{F_i, i=0, \ldots, I\}$.

Furthermore, $F_D(d)$ may be represented by its associated sample-data density function, which may be denoted as $f_D(d)$, where $$\int_{u=0}^{u=d} f_D(u)\,du = F_D(d),$$

where the symbol d in the differential du is not to be confused with the variable d used in $F_D(d)$. In practice, the above integration is performed only approximately. Furthermore, the above integral is to be interpreted quite generally, so as to include a discrete sum.

The sample-data density function $f_D(d)$ may be empirically determined before $F_D(d)$ is actually calculated. For example, for some embodiments, the fractional number of die bump distances falling within the intervals $(d_i-\delta/2, d_i+\delta/2]$, $i=0, 1, \ldots, I$, for some suitably chosen $\delta$, may be measured, where these intervals are disjoint and completely cover some interval $(0, d_{MAX}]$. These fractional numbers may be scaled to give a set of numbers $\{f_i, i=0, \ldots, I\}$ so that $$\sum_{i=0}^{i=I} f_i \delta = 1.$$

The above sum may also be written as $$\int_{u=0}^{u=d_{MAX}} f_D(u)\,du = 1$$

when one generalizes an integration to include a discrete sum, as discussed previously. This merely states that the area under the sample-date density function curve is unity.

For some embodiments, the sample-data density function $f_D(d)$ may be represented by a data structure comprising a list of $(I+1)$ numbers $f_i$, $i=0, \ldots, I$, and comprising a data structure where the index i references the interval $(d_i-\delta/2, d_i+\delta/2]$. For a given d' within the interval $(0, d_{MAX}]$, a look-up method comprises finding the index j where d'$\in (d_j-\delta/2, d_j+\delta/2]$, in which case $f_j$ is the result where $f_j=f_D(d')$. With these data structures, and with the look-up method so described, $F_D(d)$ may be found by integrating (summing) $f_D(d)$ as discussed previously.

Accordingly, the data structure $f_i$, $i=0, \ldots, I$, and the data structure in which i references the interval $(d_i-\delta/2, d_i+f/2]$, sufficiently describe the sample-data distribution function $F_D(d)$, so that a sample-data distribution function may be represented by a sample-data density function, and when implemented in a computer system, more than one kind of data structure may be used.

The above discussion on the sample-data density function $f_D(d)$ and its relationship to $F_D(d)$ and various data structures is also applicable to a sample-data density function and data structures associated with the sample-data distribution function $F_Z(z)$.

Embodiments provide a set of pairs $\{(d_k, z_k), k=0, 1, \ldots, K\}$, where $F_D(d_k)=F_Z(z_k)$. This set of pairs provides a mapping from die bump distance values to lumped circuit parameter values.

Figure 3:
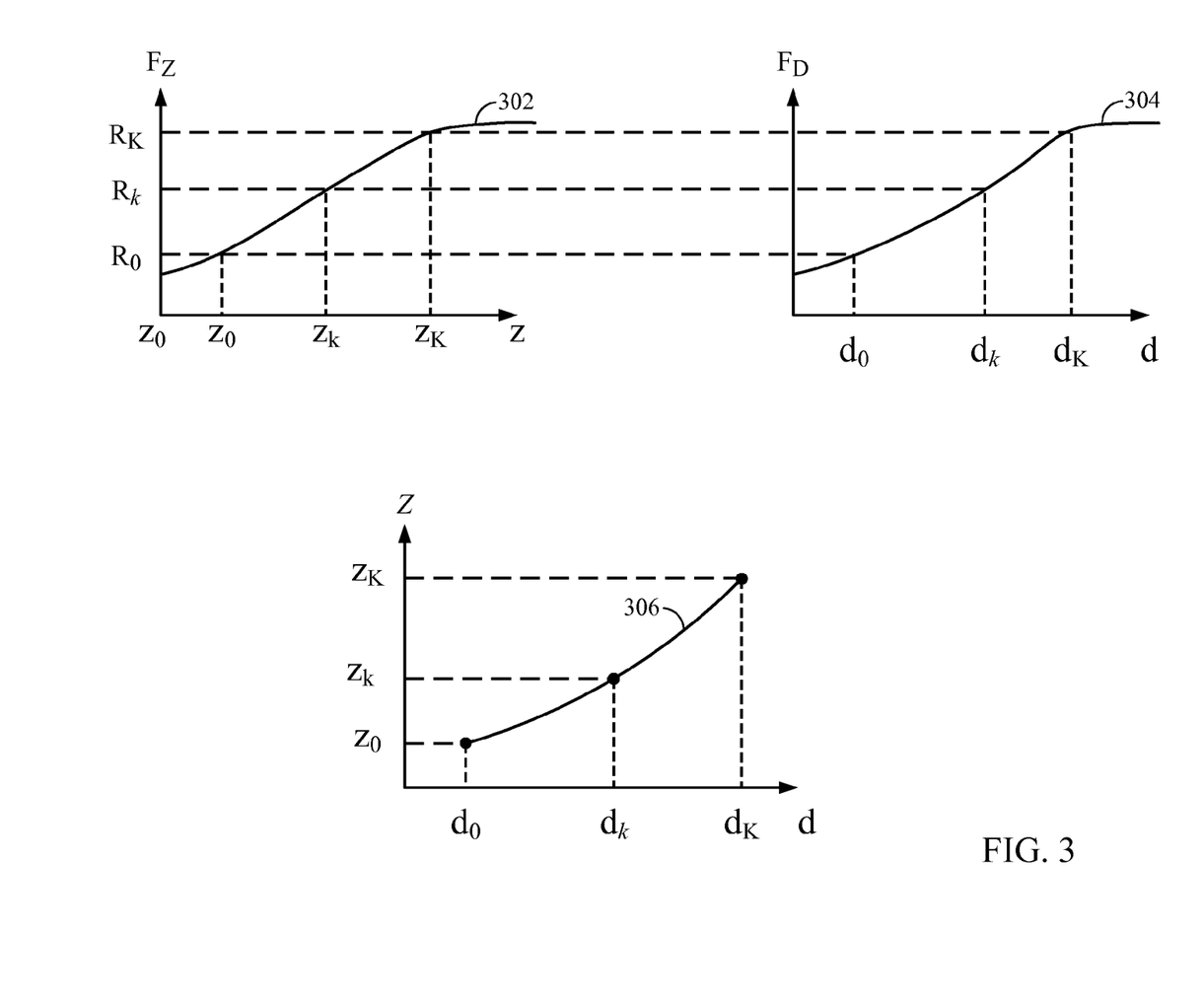
FIG. 3 illustrates a graphical method for generating a mapping between die bump distance values and lumped circuit parameter values according to an embodiment.

The previous paragraph is concise, and may be elaborated as follows. When considering a sample-data distribution function for a lumped circuit parameter variable, $F_Z(z)$, the lumped circuit parameter values of interest may lie within some range $[z_0, z_k]$, where $F_Z(z_0)$ may be written as $F_Z(z_0)=R_0$, and $F_Z(z_K)$ may be written as $F_Z(z_K)=R_K$. For example, $R_0$ may be chosen as $R_0=0.1$, and $R_K$ may be chosen as $R_K=0.9$. A $d_0$ may be associated with $z_0$, where $F_D(d_0)=R_0$, and a $d_K$ may be associated with $z_K$, where $F_D(d_K)=R_0$. These set the two extreme pairs $(d_0, z_0)$ and $(d_K, z_K)$. This is illustrated in FIG. 3, where curve 302 represents the sample-data distribution function $F_Z(z)$ and curve 304 represents the sample-data distribution function $F_D(d)$. FIG. 3 illustrates a graphical representation for finding the pairs $(d_0, z_0)$ and $(d_K, z_K)$, which become the end points for curve 306.

Additional points (pairs) are found by choosing one or more numbers between $R_0$ and $R_K$, such as for example $R_k$ in FIG. 3. This yields a $z_k$ from curve 302 and a $d_k$ from curve 304, to give another pair $(d_k, z_k)$, which becomes another point for curve 306. This procedure is continued to provide a set of pairs $\{(d_k, z_k), k=0, 1, \ldots, K\}$, where each $R_k$ is chosen to lie in the interval $[R_0, R_K]$.

Standard curve fitting procedures may be used to provide curve 306, which may be represented by the function $z=f(d)$. For some embodiments, not all of pairs (points) $\{(d_k, z_k), k=0, 1, \ldots, K\}$ may lie on curve 306. For example, some curve fitting procedures may provide a curve that does not pass through all points represented by these pairs.

The function $z=f(d)$ stands for a mapping or correspondence between die bump distance values and lumped circuit parameter values, and may be represented by various data structures and calculated by various routines. For example, a polynomial curve of some order may be chosen for $f(\cdot)$ to satisfy some criterion of goodness, where $z_k=f(d_k)$ for $k=0, 1, \ldots, K$. Or, a table may comprise the pairs $\{(d_k, z_k), k=0, 1, \ldots, K\}$, and any one of a number of table look-up procedures may be employed on this table data structure.

A circuit designer may associate the lumped circuit parameter value $z'=f(d')$ with a die bump having a distance value $d'$ from the die center. In this way, once given the function $z=f(d)$, which may be parameterized by an offset, semiconductor process technology, etc., a circuit designer may quickly estimate overall packaged integrated circuit performance based upon a set of die bump distance values.

As discussed previously, the lumped circuit parameter variable Z represents any one of a number of lumped circuit parameter variables. Accordingly, the process indicated by FIG. 3 may be repeated more than once, with different interpretations for the sample-data distribution function $F_Z(z)$, to derive a function $z=f_L(d)$ for inductance, a function $z=f_R(d)$ for resistance, and so on, for all the lumped circuit parameters of interest.

Figure 4:
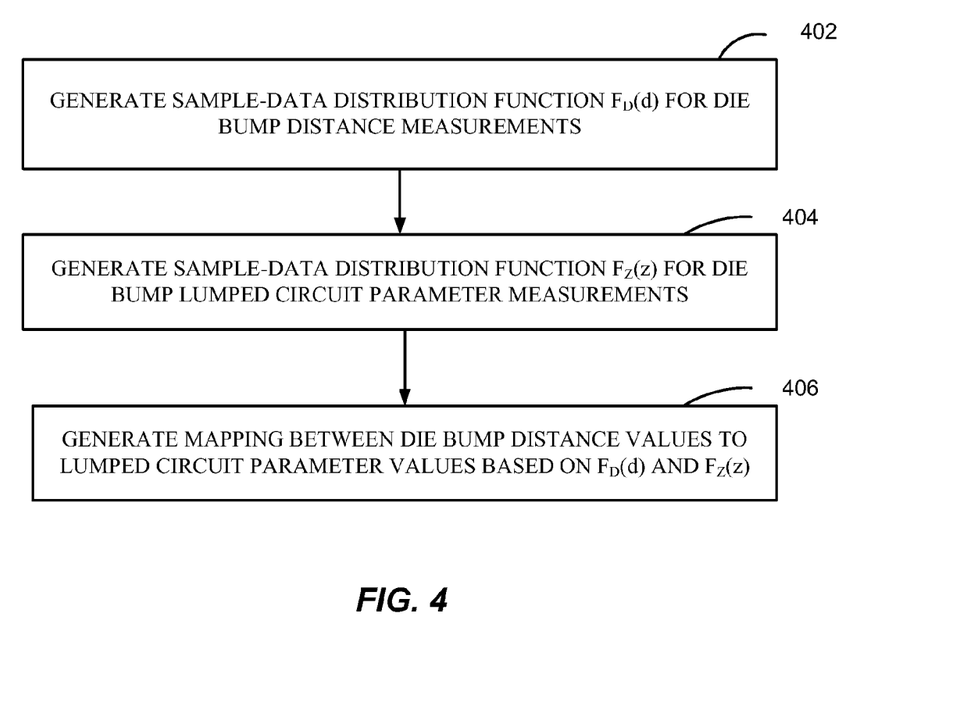
FIG. 4 illustrates a flow diagram for generating a mapping between die bump distance values and lumped circuit parameter values according to an embodiment.

The flow diagram of FIG. 4 briefly summarizes an embodiment, where in block 402 the sample-data distribution function for die bump distance measurements is generated, in block 404 the sample-data distribution function for die bump lumped circuit parameter measurements is generated, and in block 406 a mapping between die bump distance values and lumped circuit parameter values based upon the sample-data distribution functions is generated, as illustrated with respect to FIG. 3.

Figure 5:
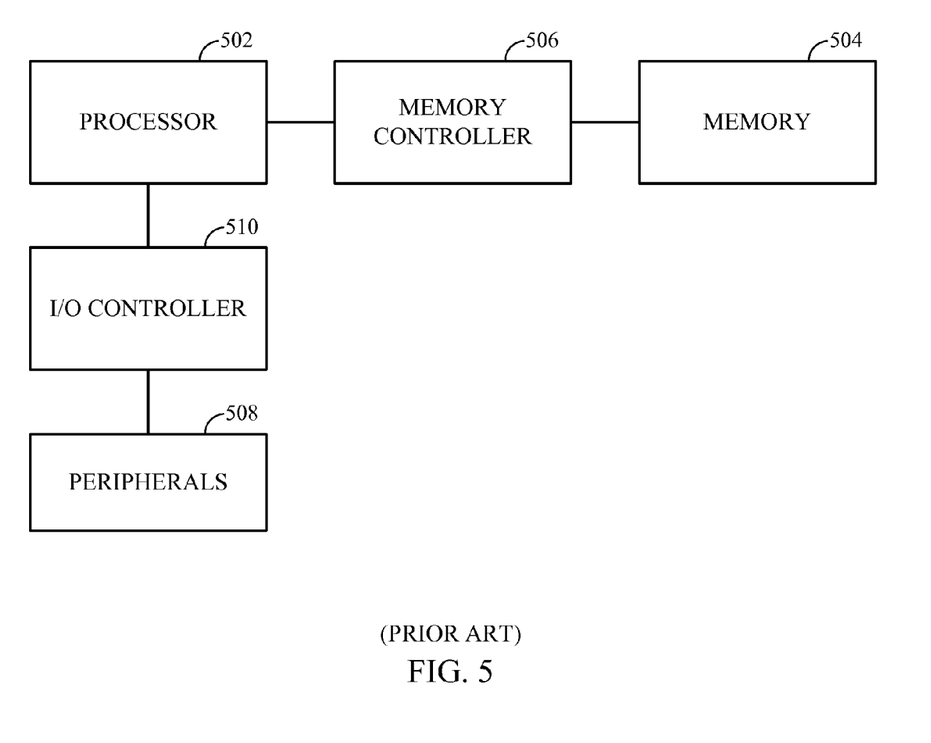
FIG. 5 illustrates a typical computer system for implementing an embodiment embodied as software stored in a computer readable medium.

These procedures may be implemented by a computer system, such as that illustrated in FIG. 5, comprising processor 502 in communication with computer readable medium (memory) 504 by way of memory controller 506, and in communication with peripherals 508 by way of input and output controller 510. Instructions for carrying out the procedure described previously (e.g., FIG. 3), and for implementing the data structures described previously, may be stored in computer readable medium 504. Some of the computer components illustrated in FIG. 5 may be integrated with processor 502. Compute readable medium 504 may represent a hierarchy of memory. Embodiments are not limited to running on computer systems such as that illustrated in FIG. 5. For example, special-purpose integrated circuits, or firmware, may be employed.

Other embodiments may be described. Some embodiments may provide a set of pairs $\{(d_k, z_k), k=0, 1, \ldots, K\}$, where $F_D(d_k)=S\{F_Z(z_k)\}$, where $S\{\}$ denotes a smoothing function. That is, $S\{F_Z(z)\}$ is a smoothed version of $F_Z(z)$, where $S\{F_Z(z)\}$ is an increasing function in the variable z, and where $0 \leq F_Z(z) \leq 1$. Similar remarks apply to $F_D(d)$, so that some embodiments may provide a set of pairs $\{(d_k, z_k), k=0, 1, \ldots, K\}$, where $S\{F_D(d_k)\}=F_Z(z_k)$.

Some embodiments may provide a set of pairs $\{(d_k, z_k), k=0, 1, \ldots, K\}$ such that $F_D(d_k)=F_Z(z_k)$, where $F_Z(z)$ is an increasing function in z, where $0 \leq F_Z(z) \leq 1$, and where $F_Z(z)$ is determined by simulation or empirical methods to give an estimate of the probability of the event $\{Z \leq z\}$.

In light of the above discussion with respect to $S\{\ \}$ and $F_Z(z)$, and to keep notation to a minimum, the functions $F_D(d)$ and $F_Z(z)$ are to be generalized so as to include sample-data distribution functions as described previously, or smoothed functions of sample-data distribution functions as described previously. Additionally, the function $F_Z(z)$ may be interpreted to be a simulated or empirically determined estimate of the probability of the event $\{Z \leq z\}$.

Various modifications may be made to the described embodiments without departing from the scope of the invention as claimed below.

Throughout the description of the embodiments, various mathematical relationships are used to describe relationships among one or more quantities. For example, a mathematical relationship or mathematical transformation may express a relationship by which a quantity is derived from one or more other quantities by way of various mathematical operations, such as addition, subtraction, multiplication, division, etc. Or, a mathematical relationship may indicate that a quantity is larger, smaller, or equal to another quantity. These relationships and transformations are in practice not satisfied exactly, and should therefore be interpreted as "designed for" relationships and transformations. One of ordinary skill in the art may design various working embodiments to satisfy various mathematical relationships or transformations, but these relationships or transformations can only be met within the tolerances of the technology available to the practitioner.

Accordingly, in the following claims, it is to be understood that claimed mathematical relationships or transformations can in practice only be met within the tolerances or precision of the technology available to the practitioner, and that the scope of the claimed subject matter includes those embodiments that substantially satisfy the mathematical relationships or transformations so claimed.

What is claimed is:

1. A method comprising:
    generating, by using a computer, a sample-data distribution function $F_D(d)$ based upon a set of die bump distance measurements associated with a first set of die bumps, where d is a real-valued variable and $F_D(d)$ is the fraction of the number of die bump distance measurements in the set of die bump distance measurements less than or equal to d;
    generating a sample-data distribution function $F_Z(z)$ based upon a set of lumped circuit parameter measurements associated with a second set of die bumps, where z is a real-valued variable and $F_Z(z)$ is the fraction of the number of lumped circuit parameter measurements in the set of lumped circuit parameter measurements less than or equal to z; and
    generating a set of pairs $\{(d_k, z_k), k=0, 1, \ldots, K\}$, where $F_D(d_k)=F_Z(z_k)$; and wherein the die bump distance is a distance from a die bump center to die center.

2. The method as set forth in claim 1, wherein the first and second sets of die bumps are equivalent sets.

3. The method as set forth in claim 1, further comprising:
    generating a mapping based upon the set of pairs $\{(d_k, z_k), k=0, 1, \ldots, K\}$ to provide a set of lumped circuit parameter values associated with a set of die bump distance values.

4. The method as set forth in claim 3, wherein the mapping is based upon a polynomial fit to the set of pairs $\{(d_k, z_k), k=0, 1, \ldots, K\}$.

5. The method as set forth in claim 1, wherein the lumped circuit parameter measurements associated with the second set of die bumps are measurements of inductance associated with the second set of die bumps.

6. The method as set forth in claim 1, wherein the lumped circuit parameter measurements associated with the second set of die bumps are measurements of resistance associated with the second set of die bumps.

7. A method comprising:
    generating, by using a computer, a set of lumped circuit parameter values associated with a set of die bump distance values, based upon a set of pairs $\{(d_k, z_k), k=0, 1, \ldots, K\}$, where $F_D(d_k)=F_Z(z_k)$, where $F_D(d)$ is a sample-data distribution function of a die bump distance variable D and d is a real-valued variable, and where $F_Z(z)$ is a sample-data distribution function of a lumped circuit parameter variable Z and z is a real-valued variable, where $F_D(d)$ is based upon a set of die bump distance measurements associated with a set of die bumps, where $F_D(d)$ is the fraction of the number of die bump distance measurement in the set of die bump distance measurements less than or equal to d; and where $F_Z(z)$ is based upon a set of lumped circuit parameter measurements associated with a second set of die bumps, where $F_Z(z)$ is the fraction of the number of lumped circuit parameter measurements in the set of lumped circuit parameter measurements less than or equal to z; and
    wherein the die bump distance is a distance from a die bump center to die center.

8. The method as set forth in claim 7, wherein the first and second sets of die bumps are equivalent sets.

9. The method as set forth in claim 7, wherein generating the set of lumped circuit parameter values associated with the set of die bump distance values comprises generating a mapping $z=f(d)$ based upon the set of pairs $\{(d_k, z_k), k=0, 1, \ldots, K\}$.

10. The method as set forth in claim 9, wherein the mapping $z=f(d)$ is a polynomial function.

11. The method as set forth in claim 10, wherein $z_k=f(d_k)$ for $k=0, 1, \ldots, K$.

12. The method as set forth in claim 7, wherein the lumped circuit parameter variable Z is an inductance variable.

13. The method as set forth in claim 7, wherein the lumped circuit parameter variable Z is a resistance variable.

14. An article of manufacture comprising a non-transitory computer readable medium having instructions thereon to cause a computer to:
    generate a set of lumped circuit parameter values associated with a set of die bump distance values, based upon a set of pairs $\{(d_k, z_k), k=0, 1, \ldots, K\}$, where $F_D(d_k)=F_Z(z_k)$, where $F_D(d)$ is a sample-data distribution function based upon a set of die bump distance measurements associated with a first set of die bumps, where $F_D(d)$ is the fraction of the number of die bump distance measurements in the set of die bump distance measurements less than or equal to d; and where $F_Z(z)$ is a sample-data distribution function based upon a set of lumped circuit parameter measurements associated with a second set of die bumps, where $F_Z(z)$ is the fraction of the number of lumped circuit parameter measurements in the set of lumped circuit parameter measurements less than or equal to z; and wherein the die bump distance is a distance from a die bump center to die center.

15. The article of manufacture as set forth in claim 14, wherein the first and second sets of die bumps are equivalent sets.

16. The article of manufacture as set forth in claim 14, wherein generating the set of lumped circuit parameter values associated with the set of die bump distance values comprises generating a mapping $z=f(d)$ based upon the set of pairs $\{(d_k, z_k), k=0, 1, \ldots, K\}$.

17. The article of manufacture as set forth in claim 16, wherein the mapping $z=f(d)$ is a polynomial function.

18. The article of manufacture as set forth in claim 17, wherein $z_k=f(d_k)$ for $k=0, 1, \ldots, K$.

* * * * *